(12) United States Patent
Moon et al.

(10) Patent No.: US 11,571,854 B2
(45) Date of Patent: Feb. 7, 2023

(54) PRINT PARTICLE REPLENISHMENT DEVICE

(71) Applicant: Hewlett-Packard Development Company, L.P., Spring, TX (US)

(72) Inventors: Ji-Won Moon, Seongnam-si (KR); Min-Chul Lee, Seongnam-si (KR); Woong-Yong Choi, Seongnam-si (KR); Matthew James Storey, Austin, TX (US); Jefferson Blake West, Austin, TX (US); Zackary Thomas Hickman, Austin, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 29 days.

(21) Appl. No.: 17/047,211

(22) PCT Filed: Aug. 30, 2018

(86) PCT No.: PCT/US2018/048818
§ 371 (c)(1),
(2) Date: Oct. 13, 2020

(87) PCT Pub. No.: WO2020/046334
PCT Pub. Date: Mar. 5, 2020

(65) Prior Publication Data
US 2021/0162666 A1    Jun. 3, 2021

(51) Int. Cl.
*G03G 15/08*    (2006.01)
*B29C 64/255*    (2017.01)
(Continued)

(52) U.S. Cl.
CPC ......... *B29C 64/255* (2017.08); *B29C 64/209* (2017.08); *B29C 64/241* (2017.08);
(Continued)

(58) Field of Classification Search
CPC ............... G03G 15/08; G03G 15/0872; G03G 15/0886
(Continued)

(56) References Cited

U.S. PATENT DOCUMENTS 6,209,995 B1    4/2001    Grune et al.
6,332,065 B1    12/2001    Howard
(Continued)

FOREIGN PATENT DOCUMENTS

AU    2015201827    *    4/2015
CN    85 2 03772 U        5/1986
(Continued)

*Primary Examiner* — Hoan H Tran
(74) *Attorney, Agent, or Firm* — Foley & Lardner LLP (57) ABSTRACT

Examples of a print a print particle replenishment device are described. In some examples, a print particle replenishment device includes a rotating member to rotate about a central axis of the print particle replenishment device. In some examples, the rotating member includes an opening offset from the central axis. In some examples of a print particle replenishment device, a nozzle is offset from the central axis, where the nozzle is to slide with respect to an interior plane of the rotating member to align with the opening to transfer print particles through the nozzle and opening when in an open position. In some examples, a print particle replenishment device includes an extension that protrudes with respect to the opening to engage a port cover of a host device to move the port cover to open a port for replenishment at rotation.

22 Claims, 4 Drawing Sheets

(51) Int. Cl.
*B33Y 30/00* (2015.01)
*B29C 64/209* (2017.01)
*B29C 64/241* (2017.01)

(52) U.S. Cl.
CPC .......... *B33Y 30/00* (2014.12); *G03G 15/0867* (2013.01); *G03G 15/0886* (2013.01)

(58) Field of Classification Search
USPC ........................................ 399/252, 258–262
See application file for complete search history.

(56) References Cited

U.S. PATENT DOCUMENTS

| | | |
|---|---|---|
| 6,421,518 B1 | 7/2002 | Floyd et al. |
| 9,207,580 B2 | 12/2015 | Janssen |
| 9,540,223 B2 | 1/2017 | Vandekerckhove et al. |
| 2017/0190118 A1 | 7/2017 | Mire et al. |

FOREIGN PATENT DOCUMENTS

| | | |
|---|---|---|
| CN | 201856450 U | 6/2011 |
| EP | 1 293 843 A2 | 3/2003 |
| EP | 2 367 068 A2 | 9/2011 |
| EP | 2 624 068 A1 | 8/2013 |
| WO | 2012/062171 A1 | 5/2012 |

\* cited by examiner

PRINT PARTICLE REPLENISHMENT DEVICE

BACKGROUND

Some types of printing utilize print particles, such as print toner or powder. For example, three-dimensional (3D) printing may utilize one or more kinds of print particles. In some examples of 3D printing, 3D solid parts may be produced from a digital model using an additive printing process. 3D printing may be used in rapid prototyping, mold generation, mold master generation, and short-run manufacturing. Some 3D-printing techniques are considered additive processes because they involve the application of successive layers of build material. In some 3D-printing techniques, the build material may be cured or fused. Laser jet printing may utilize print toner. For example, a printer may cause toner particles to be fused to a piece of paper.

DETAILED DESCRIPTION

Some printing technologies utilize print particles. Examples of print particles include three-dimensional (3D) print powder and toner. In some examples, an average diameter of 3D print powder particles of this disclosure may be less than 50 microns and/or an average diameter of toner particles of this disclosure may be less than 20 microns. It should be noted that in some examples, some print particles may be round, approximately round, or non-round. Print particles may become airborne and contaminate the environment if not controlled. Control may be difficult when print particle bottles are supplied to inexperienced users in environments like offices or homes (e.g., home offices). Flow characteristics of particles may be harder to predict than, for example, fluids. As can be observed from this discussion, devices and techniques that enable cleaner and simpler transfer of print particles may be beneficial.

Ensuring transfer of authentic print particles may also be beneficial. For example, preventing the use of print particles that perform worse or that are incompatible with a printer may be beneficial.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

Figure 1A:
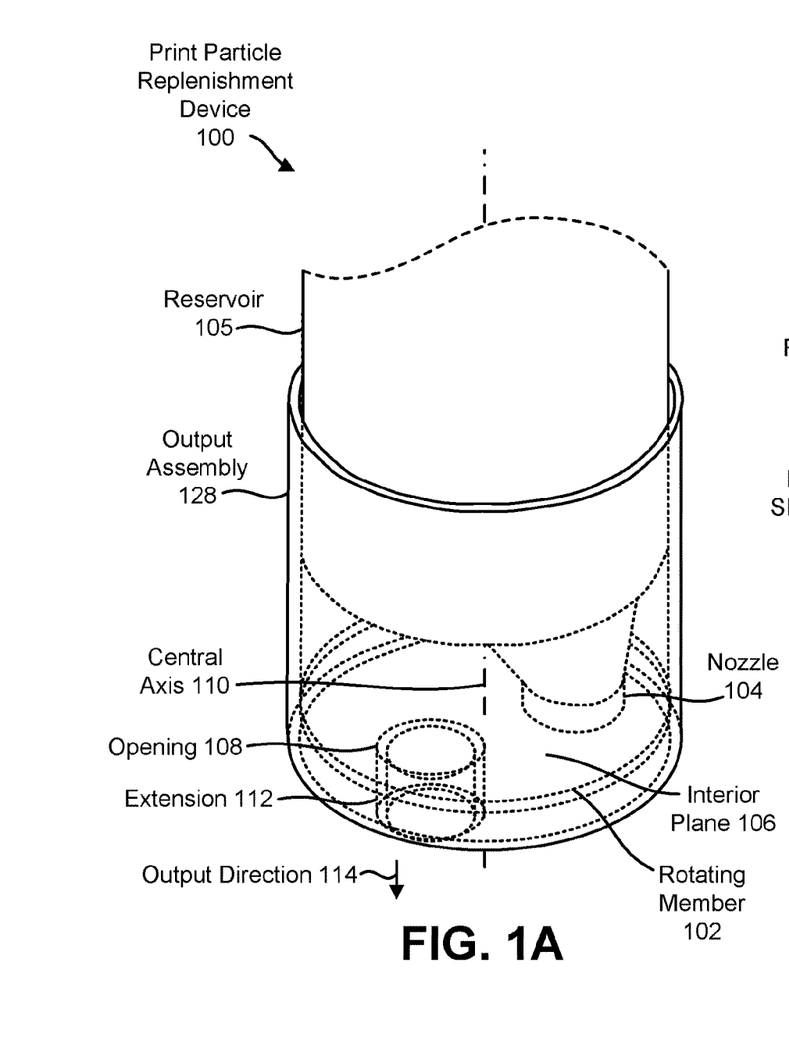
FIG. 1A is a perspective view of an example of a print particle replenishment device.

FIG. 1A is a perspective view of an example of a print particle replenishment device 100. Examples of the print particle replenishment device 100 include containers and bottles. The print particle replenishment device 100 may contain and/or transfer print particles. For example, the print particle replenishment device 100 may be designed to interface with a host device. A host device is a device that uses and/or applies print particles. Examples of a host device include printers and print cartridges. For example, it may be beneficial to replenish or refill a printer and/or print cartridge with print particles. For instance, a host device may have a useful life beyond use of an amount (e.g., contained amount) of print particles. Accordingly, it may be beneficial to replenish a container in a host device with print particles rather than replacing the host device.

In the example illustrated in FIG. 1A, the print particle replenishment device 100 may be adapted to transfer print particles and/or deliver print particles to a host device from a reservoir 105 of the print particle replenishment device 100. For example, the print particle replenishment device 100 may interface with a host device (e.g., a host device receptacle).

In some examples, the print particle replenishment device 100 may be cylindrical in shape. For example, the print particle replenishment device 100 may have a generally cylindrical outer shape and/or cylindrical inner shape, elongated along a print particle output direction 114. In some examples, the print particle replenishment device 100 may have another shape (e.g., polygonal, irregular, prismatic, etc.). In some examples, the print particle replenishment device 100 may be adapted to fit within a housing sleeve of a host device. For example, an outer circumference of the print particle replenishment device 100 may be adapted to fit within a housing sleeve of a host device.

As used herein, the term "cylindrical" may mean approximate conformity to a cylinder shape. For example, a cylindrical output assembly may include one or more portions that conform to or approximate a cylinder shape. For instance, a cylindrical print particle replenishment device may include one or more outer curved sections and/or an approximately circular end or base, while another end may or may not be circular.

In some examples, the print particle replenishment device 100 may include a reservoir 105 for storing print particles (e.g., print powder, toner, etc.). In some examples, the reservoir 105 may represent a narrower section of the print particle replenishment device 100 than an output assembly 128 of the print particle replenishment device 100. In some examples, the reservoir 105 may be collapsible to provide print particles to the nozzle 104. In some examples, the print particle replenishment device 100 may include a plunger to collapse the reservoir 105. For example, a plunger may include a shaft with a gasket that may be pressed into the reservoir 105 to expel the print particles out of the nozzle. In some examples, the reservoir 105 may be cylindrical about the central axis 110.

In some examples, the print particle replenishment device 100 may include a rotating member 102. The rotating member 102 may be adapted to rotate about a central axis 110 (and/or a rotating axis that may or may not be the central axis 110). For example, the rotating member 102 may rotate in a plane that is perpendicular to the central axis 110 and/or perpendicular to an output direction 114.

In some examples, one or more of the features (e.g., structures, portions, planes, disks, covers, etc.) described herein may relate to the output direction 114 (e.g., may be perpendicular to the output direction 114, may be parallel to the output direction 114, may rotate with respect to the output direction 114, etc.) instead of or in addition to a central axis 110 or rotating axis. In some examples, the output direction 114 may be a general direction of print particle flow. In some examples, the general direction of print particle flow may be generally in the direction of gravity when the print particle replenishment device 100 is in a docked position. For example, the print particle replenishment device 100 may be oriented vertically with respect to gravity when docked. In other examples, the print particle replenishment device 100 may be oriented in different orientations.

In some examples, the rotating member 102 may include an opening 108. The opening 108 may be an opening or channel through which print particles may be transferred or delivered. In the example of FIG. 1A, the opening 108 is illustrated as a circular hole. It should be noted that in other examples, the opening 108 may have different shapes and/or locations. For example, the opening 108 may be a notch, ellipse, kidney, crescent, circle, irregular, semi-circle in shape, or another shape. In some examples, the opening 108 may be offset from the central axis 110. In some examples, the print particles may flow through the opening 108 generally along an output direction 114 (e.g., print particle output direction).

In some examples, the print particle replenishment device 100 may include a nozzle 104. The nozzle 104 may be a channel for transferring or conducting the print particles out of the reservoir 105. In some examples, the nozzle 104 may have a conical, funnel, tubular, prismatic, rectangular, or cylindrical shape. In some examples, the nozzle 104 may be offset from the central axis 110.

In some examples, the nozzle 104 may be adapted to slide with respect to an interior plane 106 of the rotating member 102. For example, a portion of the rotating member 102 within the print particle replenishment device 100 (e.g., output assembly) may be planar. For example, a plane of the rotating member 102 may be perpendicular to the central axis 110 and/or output direction 114. In some examples, the nozzle 104 may be adapted to slide with respect to the interior plane 106 to align with the opening 108. The nozzle may slide over (e.g., in contact with) the interior plane 106 in some examples. The nozzle 104 may be aligned with the opening 108 to transfer print particles through the nozzle 104 and opening 108 when in an open position.

In some examples, the reservoir 105 may include the nozzle 104, and the output assembly 128 may be attached to the reservoir 105. For example, the output assembly 128 may be attached to the reservoir 105 with mechanical structures (e.g., threads, keepers, tabs, etc.), adhesive, and/or welding. In some examples, the output assembly 128 may house the rotating member 102.

In some examples, the print particle replenishment device 100 may include an extension 112. The extension 112 may protrude (e.g., protrude outward) from the rotating member 102. In some examples, the extension 112 may protrude with respect to the opening 108. In some examples, the opening 108 is part of the extension 112.

In some examples, the extension 112 may be adapted to engage a port cover of a host device to move the port cover to open a port for replenishment at rotation. In some examples, the extension 112 may be adapted to fit within a counterpart structure (e.g., counterpart tubular structure) of a port cover. For example, the extension 112 may fit within a port cover and/or may rotate the port cover to open the port. In some examples, the extension 112 may be adapted to slide on an interior port plane of a host device (e.g., host device receptacle). For example, an end of the extension 112 may contact and slide along a plane that includes a port on the host device.

The extension 112 may be implemented in a variety of shapes. For examples, the extension 112 may be cylindrical, conical, funnel, tubular, prismatic, rectangular, notch, elliptical, kidney, crescent, circular, irregular, and/or semi-circular in shape, or another shape.

Figure 1B:
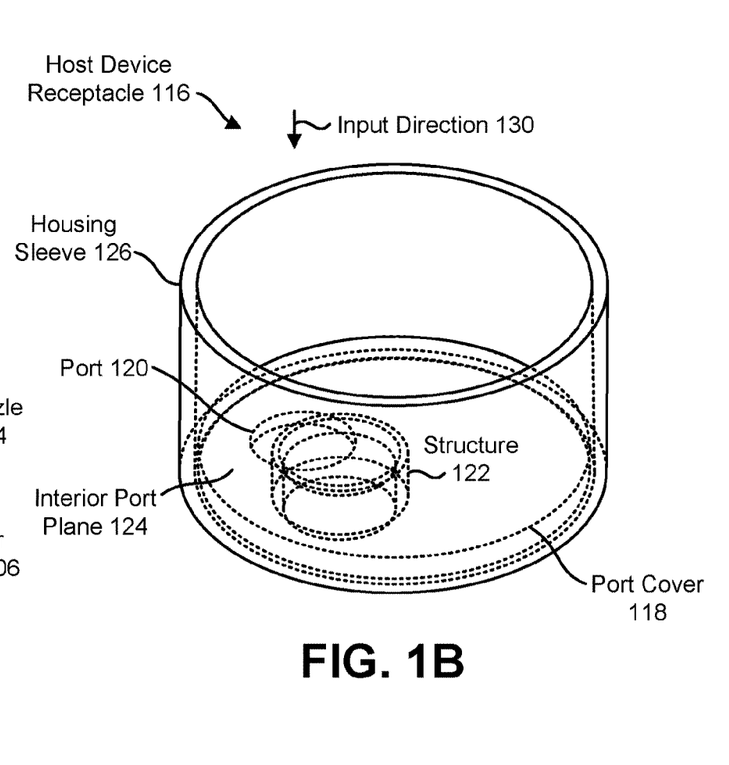
FIG. 1B is a perspective view of an example of a host device receptacle.

FIG. 1B is a perspective view of an example of a host device receptacle 116. The host device receptacle 116 may be adapted to receive and/or engage with the print particle replenishment device 100 described in connection with FIG. 1A. For example, the host device receptacle 116 may be a recess that receives an end of the print particle replenishment device 100.

The host device receptacle 116 may include a housing sleeve 126. In some examples, the housing sleeve 126 may be cylindrical in shape. In some examples, the host device receptacle 116 (e.g., housing sleeve 126) may have another shape (e.g., polygonal, irregular, prismatic, etc.). In some examples, the print particle replenishment device 100 may be adapted to fit within the housing sleeve 126 of a host device. For example, an outer circumference of the print particle replenishment device 100 may be adapted to fit within the housing sleeve 126 of a host device.

The host device receptacle 116 may include a port cover 118. The port cover 118 may cover a port 120 (e.g., print particle input opening) of the host device. In some examples, the port cover 118 may be situated on an interior port plane 124. The interior port plane 124 may be a plane that includes the port 120. The interior port plane 124 may be in the interior of the host device receptacle 116 in that the interior port plane 124 may be covered (e.g., partially or completely covered) by the port cover 118. In some examples, the interior port plane 124 may be disposed perpendicular to an input direction 130.

In some examples, the host device receptacle 116 (e.g., port cover 118) may include a structure 122 (e.g., channel). The structure 122 may be adapted to receive the extension 112 of the print particle replenishment device 100. For example, the structure 122 may receive and/or engage with the extension 112 when the print particle replenishment device 100 is inserted into the host device receptacle 116. For example, the extension 112 may fit within the structure 122. The structure 122 may be implemented in a variety of shapes. For examples, the structure 122 may be cylindrical, conical, funnel, tubular, prismatic, rectangular, square, notch, elliptical, kidney, crescent, circular, irregular, and/or semi-circular in shape, or another shape.

In some examples, the port cover 118 may be adapted to move (e.g., slide, rotate) relative to the port 120 to align a structure 122 with the port 120. In some examples, the port cover 118 may be situated within the housing sleeve 126. In some examples, the port cover 118 may be disposed perpendicular to an input direction 130 of the print particles. In some examples, the port cover 118 may be adapted to shear relative to the interior port plane 124 during rotation of the print particle replenishment device 100. For example, the port cover 118 may rotate with the extension 112. The rotation of the port cover 118 may align the structure 122 with the port 120. Accordingly, the nozzle 104, opening 108, extension 112, and/or structure 122 may be rotated into alignment with the port 120.

Figure 2:
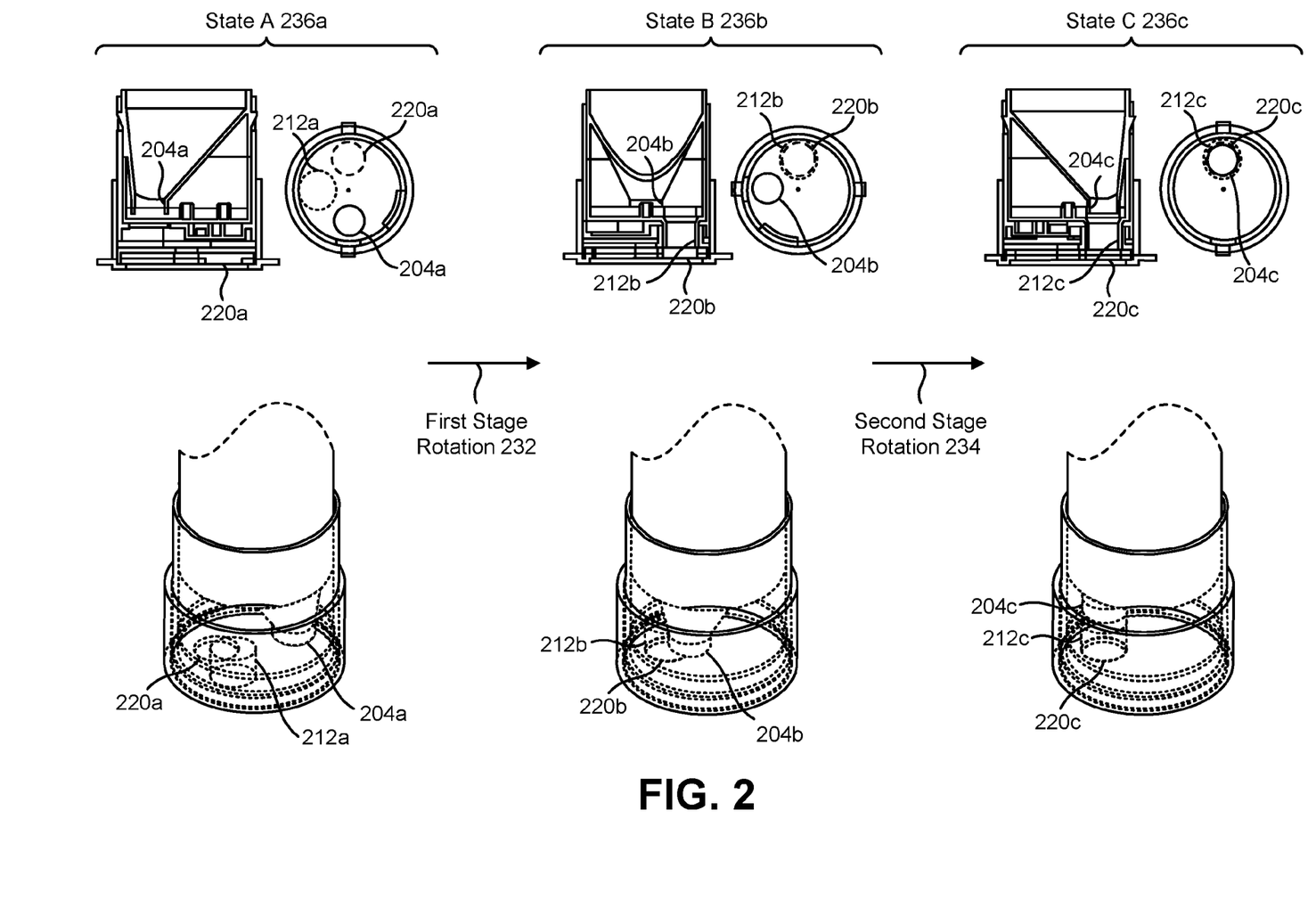
FIG. 2 illustrates examples of a first stage rotation and a second stage rotation of a print particle replenishment device and a host device receptacle.

FIG. 2 illustrates examples of a first stage rotation 232 and a second stage rotation 234 of a print particle replenishment device and a host device receptacle. For example, FIG. 2 illustrates state A 236a, state B 236b (upon completing the first stage rotation 232), and state C 236c (upon completing the second stage rotation 234). A perspective view, cross-sectional side elevational view, and top elevational view of the print particle replenishment device and host device receptacle are illustrated for each state 236a-c. The print particle replenishment device illustrated in FIG. 2 may be an example of the print particle replenishment device 100 described in connection with FIG. 1A. The host device receptacle illustrated in FIG. 2 may be an example of the host device receptacle 116 described in connection with FIG. 1B.

In state A 236a, the print particle replenishment device is initially inserted (e.g., mounted) into a host device receptacle. In state A 236a, for example, an extension 212a of the host device receptacle is engaged with (e.g., inserted into) a structure of the host device receptacle. In state A 236a (e.g., before rotation), the nozzle 204a of the host device receptacle, the extension 212a, and the host device port 220a are not aligned.

During the first stage rotation 232, the extension 212a may be adapted to rotate into alignment with the port 220a of the host device (e.g., host device receptacle). During the first stage rotation 232, the extension 212a and the nozzle 204a may be adapted to maintain a rotational offset (e.g., 90 degrees). For example, in state B 236b (upon completing the first stage rotation 232), the extension 212b may be aligned with the port 220b. For example, in state B 236b (upon completing the first stage rotation 232), the extension 212b may be rotationally offset from the nozzle 204b. In the example illustrated in FIG. 2, the first stage rotation 232 includes a 90 degree clockwise rotation. It should be noted that the first stage rotation 232 may include other amounts of rotation (e.g., less than 90 degrees, greater than 90 degrees, etc.) in other examples. In some examples, the first stage rotation 232 may lock the print particle replenishment device into the host device receptacle. For example, a locking structure (e.g., tab, thread, etc.) of the print particle replenishment device rotate under an interfering structure (e.g., keeper) of the host device during the first stage rotation 232. This may prevent the print particle replenishment device from being removed when rotated. In some examples, the locking structure may be disposed on an interior or exterior of the print particle replenishment device.

During the second stage rotation 234, the nozzle 204b may be adapted to rotate into alignment with the extension 212b (and/or the port 220b of the host device (e.g., host device receptacle)). For example, in state C 236c (upon completing the second stage rotation 234), the nozzle 204c may be aligned with the extension 212c the port 220c. In the example illustrated in FIG. 2, the second stage rotation 234 includes a 90 degree rotation. It should be noted that the second stage rotation 234 may include other amounts of rotation (e.g., less than 90 degrees, greater than 90 degrees, etc.) in other examples.

Figure 3:
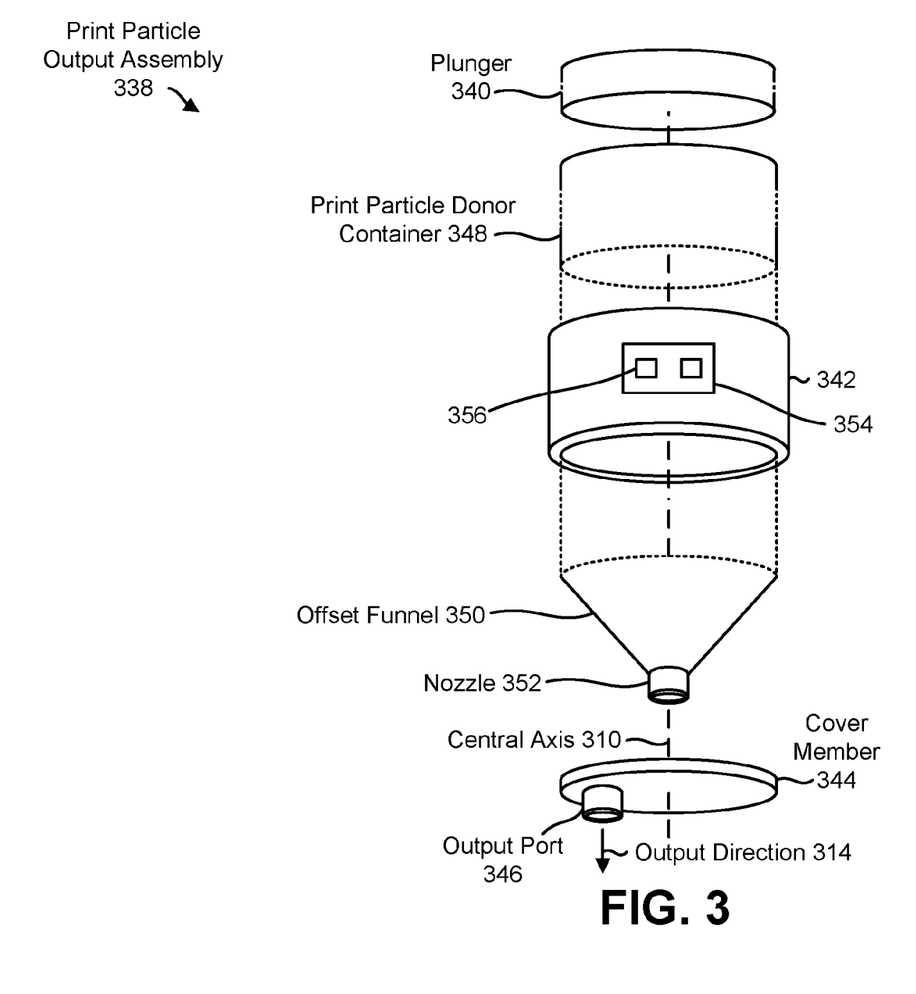
FIG. 3 is an exploded perspective view of an example of a print particle output assembly.

FIG. 3 is an exploded perspective view of an example of a print particle output assembly 338. In some examples, the print particle output assembly 338 may be a part of or may be included in a print particle replenishment device (e.g., the print particle replenishment device 100 described in connection with FIG. 1A). The print particle output assembly 338 may be adapted to output (e.g., donate, transfer, deliver, etc.) print particles to a host device (e.g., print cartridge and/or printer).

The print particle output assembly 338 may include an outer cylindrical member 342. The outer cylindrical member 342 may house one or more components of the print particle output assembly 338.

The print particle output assembly 338 may include a cover member 344. The cover member 344 may be situated at a distance within the outer cylindrical member 342. In some examples, the cover member 344 may be disposed perpendicular to the central axis 310 of the print particle output assembly 338 and/or perpendicular to an output direction 314. The cover member 344 may include an output port 346. In some examples, the output port 346 may be offset from a central axis 310 (e.g., a central axis 310 of the cover member 344). In some examples, the output port may protrude (from the cover member 344, for example). For example, the output port may protrude to a distance within the outer cylindrical member 342, to an end of the outer cylindrical member 342, or beyond the end of the outer cylindrical member 342. In some examples, the output port 346 may serve as a keying feature and as a communication (e.g., transfer, delivery) feature.

In some examples, the print particle output assembly 338 may include a print particle donor container 348. Examples of the print particle donor container 348 include bottles and syringes. In some examples, the print particle donor container 348 may be situated within the outer cylindrical member 342. In some examples, the outer cylindrical member 342 may be attached or mounted to the print particle donor container 348.

In some examples, the print particle donor container 348 may include an offset funnel 350. The offset funnel 350 may include a nozzle 352 that is offset from the central axis. For example, the nozzle 352 may be disposed near the front of the cover member 344 in the example illustrated in FIG. 3. In some examples, an opening of the offset funnel 350 may be misaligned with respect to the output port 346 of the cover member 344 when in a closed position. For example, the cover member 344 may cover the nozzle 352 until the nozzle 352 is moved (e.g., rotated) to align with the output port 346 in an open position.

In some examples, the outer cylindrical member 342 may fit within a receiving sleeve (e.g., housing sleeve 126) of a host device at engagement. For example, the outer cylindrical member 342 may be inserted into a receiving sleeve of the host device (e.g., host device receptacle). In some examples, the output port 346 may be adapted to fit within an offset receiving hole of a cover disk of a host device (e.g., host device receptacle). A cover disk may be an example of the port cover 118 described in connection with FIG. 1B, where the port cover 118 has a disk shape. The cover disk may have a receiving hole (e.g., structure 122) that is offset from a central axis. For example, the output port 346 may be inserted into the receiving hole of the cover disk.

In some examples, the output port 346 may be adapted to rotate the cover disk during a first stage rotation of the print particle donor container 348. For example, the output port 346 may rotate the cover disk to align the output port (and the hole of the cover disk) to a port of the host device. The cover disk may cover the port of the host device when in a closed position. During a second stage of rotation, the offset funnel 350 (e.g., nozzle 352) may rotate to align with the output port 346 and the port (e.g., input port) of the host device.

In some examples, the print particle output assembly 338 (e.g., outer cylindrical member 342) may include an integrated circuit 354. The integrated circuit may include a memory device (e.g., electrically erasable programmable read-only memory (EEPROM)). The memory device may storing dispense status data and/or authentication data. For example, the print particle output assembly 338 may include a memory device disposed in the interior of the outer cylindrical member 342.

In some examples, the integrated circuit 354 may include one or more contact pads 356. The contact pad(s) 356 may be electrical contacts (e.g., electrical structures, plates, etc.) for interfacing with (e.g., touching) counterpart contact(s) on the host device. For example, the contact pads 356 may be metallic contacts capable of communicating electrical or electronic signals. For example, the integrated circuit 354 may include a row of contact pads 356 arranged at a side of the print particle output assembly 338 (e.g., outer cylindrical member 342). In some examples, the contact pads 356 may be adapted to contact counterpart contact pads of a host device receptacle in docked position. In some examples, a host device receptacle may include the counterpart contact pad(s) disposed on an interior of a housing sleeve 126. For example, the contact pads 356 may contact the counterpart contact pads of the host device after rotation when an output opening (e.g., output port 346), nozzle 352, and a port on the host device are aligned.

In some examples, the contact pad(s) 356 may be disposed at a side wall of the print particle output assembly 338. For example, the contact pad(s) 356 may be disposed along a line that is a cross section of a plane that is perpendicular to the output direction 314 and a plane that is parallel to the output direction 314.

It should be noted that although the contact pads 356 are illustrated as being disposed on a side (e.g., curved) portion of the print particle output assembly 338, contact pad(s) may additionally or alternatively be disposed on the end portion (e.g., bottom portion, planar portion, cover member 344) of the print particle output assembly 338. In an example, one or more contact pads 356 may be disposed on the side of the print particle output assembly 338 and one or more other contact pads 356 may be disposed on an end (e.g., bottom) of the print particle output assembly 338. In some examples, the contact pad(s) 356 may be disposed on a plane on (e.g., approximately tangential to) the side of the print particle output assembly 338.

In some examples, the contact pads 356 may be located at any displacement relative to the output port 346 (when in a closed position, for instance). For example, contact pad(s) 356 may be located on an opposite side (e.g., centered at 180 degrees) relative to the output port 346 angle (from the central axis 310, for example), on a same side (e.g., centered at 0 degrees) relative to the output port 346 angle, laterally from the output port 346 angle (e.g., centered at 90 degrees and/or −90 degrees relative to the output port 346 angle), and/or at other dispositions. In some examples, the contact pads 356 may be located near the output port 346. For example, the contact pads 356 may be located next to the output port 346 on the end of the print particle output assembly 338. In some examples, the contact pads 356 may be located on a same structure (e.g., cover member 344) as the output port 346 and/or may be located within range from the output port 346 (e.g., within 2 centimeters (cm), 3 cm, 4 cm, 5 cm, etc.).

A number of contact pads 356 may be implemented. The contact pad(s) 356 may be utilized to interface with a memory device and/or electronic circuitry (e.g., integrated circuit) for authentication and/or dispense detection. Examples of contact pads include a ground contact, a power supply contact, a signal contact, a clock contact, and a chip select contact. In some examples, multiple signal contacts may be utilized (e.g., a signal contact for one or more authentication signals and a signal contact for one or more dispense detection signals) or a single signal contact may be utilized (e.g., a signal contact for authentication signal(s) and/or dispense detection signal(s)).

In some examples, one or more of the contact pads 356 may be utilized for authentication and/or dispense detection. For example, authentication and/or dispense detection signals may be sent via a signal contact pad. In other examples, separate contacts may be utilized for authentication and dispense detection. For example, three contact pads may be implemented: a ground contact, an authentication signal contact, and a dispense detection signal contact.

In some examples, the contact pads 356 may include a dispense detection signal contact, a dispense detection ground contact, an authentication signal contact, and an authentication ground contact. The dispense signal contact may carry a dispense indication signal and/or dispense indication data. The authentication signal contact may carry an authentication signal.

The contact pad(s) 356 may be adapted to rotate with the print particle output assembly 338 or a portion (e.g., side portion) of the print particle output assembly 338. For example, when the print particle output assembly 338 or a portion of the cylindrical output assembly rotates, the contact pad(s) 356 may rotate with the print particle output assembly 338. In some examples, the contact pad(s) 356 may maintain connection and/or contact with corresponding or counterpart contact(s) on the host device during rotation of the print particle output assembly 338. For example, contact between the print particle output assembly 338 and the host device may be made via a location on a locking ring of a host device receptacle to maintain constant contact through the entire refill process. Contacts or contact pads that rotate may be referred to as "orbiting contacts."

In some examples, one or more of the contact pads 356 may not maintain contact during rotation. For instance, the contact pad(s) 356 may provide or have intermittent connection and/or contact with corresponding or counterpart contact(s) on the host device. For example, an intermittent contact may have an intermittent connection when the print particle output assembly 338 (e.g., contact pad(s) 356) is in one or more certain orientations. In some examples, the contact pad(s) 356 may have contact before rotation and/or after rotation, and/or may not have contact during the entire range of rotation. In some examples, the contact pad(s) 356 may have contact during part of the range of rotation.

In some examples, the contact pad(s) 356 may be disposed on a protruding structure of the outer portion of the print particle output assembly 338 (e.g., outer cylindrical member 342). For example, a planar structure may protrude from the curved (e.g., side) portion of the print particle output assembly 338. The planar structure may be tangent to the curved portion (e.g., side) of the print particle output assembly 338. In some examples, the protruding structure may engage a rotating counterpart of the host device.

In some examples, the contact pad(s) 356 may be adapted to rotate with the print particle output assembly 338 when opening the output port 346 of the print particle output assembly 338. For example, the print particle output assembly 338 may be adapted to open the output port 346 when rotated relative to a host device or host device receptacle.

The contact pad(s) 356 may be coupled to a memory device and/or electronic circuitry. For example, the print particle output assembly 338 (e.g., print particle output assembly 338) may include a memory device and/or electronic circuitry. The contact pad(s) 356 may carry and/or receive one or more signals. For example, the contact pad(s) 356 may carry and/or receive one or more authentication signals and/or one or more dispense signals (e.g., dispense detection signals). In some examples, the memory device may store one or more authentication codes and/or algorithms. The print particle output assembly 338 may send an authentication code via one or more contact pads 356 and/or may send one or more authentication algorithm signals via one or more contact pads 356. In some examples, the print particle output assembly 338 may detect when the print particles have been dispensed (e.g., completely dispensed). For example, when a syringe plunger 340 has been partially or completely inserted into the print particle output assembly 338, a switch or contact within the print particle output assembly 338 may close, which may cause a dispense signal to be sent via one or more contact pads 356. In some examples, the closure of the switch or contact may change a value in the memory device, which may be indicated via one or more contact pads 356 with a dispense signal.

Figure 4:
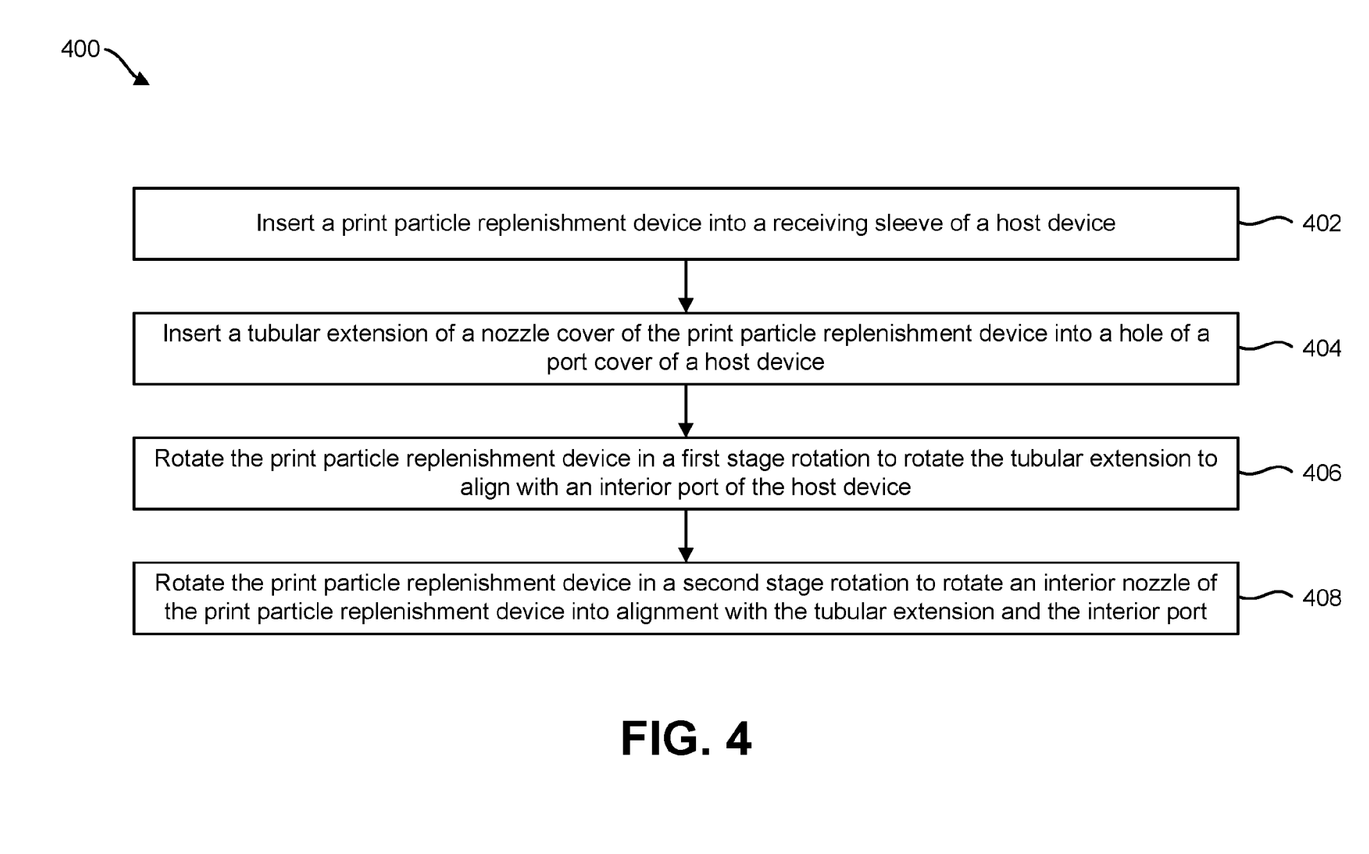
FIG. 4 is a flow diagram illustrating an example of a method for delivering print particles.

FIG. 4 is a flow diagram illustrating an example of a method 400 for delivering print particles. The method 400 may be performed by and/or with one or more of the print particle replenishment devices 100, and/or print particle output assemblies 338 described herein.

A print particle replenishment device may be inserted 402 into a receiving sleeve of a host device. For example, the print particle replenishment device may be placed in a recess of a host device receptacle.

A tubular extension of a nozzle cover (e.g., cover member) of the print particle replenishment device may be inserted 404 into a hole (e.g., structure) of a port cover of a host device. For example, and output port may be positioned in a counterpart structure of a port cover of a host device.

The print particle replenishment device may be rotated 406 in a first stage rotation to rotate the tubular extension to align with an interior port of the host device. For example, the tubular extension may rotate to align with a port (e.g., interior to a port cover) of the host device (e.g., host device receptacle). In some examples, the first stage rotation may include sliding the tubular extension of the print particle replenishment device on a plane of the interior port. In some examples, at the end of the first stage rotation, the tubular extension may reach an end of a first stage rotation range. For example, the tubular extension or another feature of the rotating member may be prevented from further rotation (e.g., by the port cover or an interfering feature of the host device receptacle).

The print particle replenishment device may be rotated 408 in a second stage rotation to rotate an interior nozzle of the print particle replenishment device into alignment with the tubular extension and the interior port. For example, the interior nozzle may rotate relative to tubular extension and the interior port. In some examples, at the end of the second stage rotation, the interior nozzle may reach an end of a second stage rotation range. For example, the interior nozzle or another feature of the print particle replenishment device may be prevented from further rotation (e.g., by an interfering feature of the rotating member).

In some examples, the method 400 may include pushing a syringe plunger into the print particle replenishment device to deliver print particles through the interior nozzle, the tubular extension, and the interior port (when in a docked position, for example). In some examples, other techniques and/or structures may be utilized to deliver the print particles. For example, a screw structure may be implemented in the replenishment device, where twisting the screw structure drives the print particles out of the replenishment device. In another example, a pump mechanism may be implemented to push the print particles out of the replenishment device. In another example, delivery of print particles may be accomplished by gravity. In another example, the print particle replenishment device may be constricted (e.g., squeezed) to drive the print particles through the interior nozzle.

The invention claimed is:

1. A print particle replenishment device, comprising:
a rotating member to rotate about a central axis of the print particle replenishment device, the rotating member comprising an opening offset from the central axis;
a nozzle offset from the central axis, wherein the nozzle is to slide with respect to an interior plane of the rotating member to align with the opening to transfer print particles through the nozzle and opening when in an open position; and
an extension that protrudes with respect to the opening to engage a port cover of a host device to move the port cover to open a port for replenishment at rotation,
wherein the nozzle is to slide over the interior plane.

2. The print particle replenishment device of claim 1, wherein the opening is part of the extension.

3. The print particle replenishment device of claim 1, wherein the print particle replenishment device has a cylindrical outer shape and cylindrical inner shape, elongated along a print particle output direction.

4. The print particle replenishment device of claim 1, wherein the extension is tubular.

5. The print particle replenishment device of claim 4, wherein the extension is to fit within a counterpart tubular structure of the port cover.

6. The print particle replenishment device of claim 1, wherein the extension is to slide on an interior port plane of the host device.

7. The print particle replenishment device claim 1, wherein an outer circumference of the print particle replenishment device is to fit within a housing sleeve of the host device.

8. The print particle replenishment device of claim 1, wherein during a first stage rotation, the extension is to rotate into alignment with the port of the host device, and the extension and the nozzle are to maintain a rotational offset.

9. The print particle replenishment device of claim 8, wherein during a second stage rotation, the nozzle is to rotate into alignment with the extension and the port of the host device.

10. The print particle replenishment device of claim 9, wherein the first stage rotation is 90 degrees or less and the second stage rotation is 90 degrees or less.

11. The print particle replenishment device of claim 1, further comprising:
a reservoir comprising the nozzle; and
an output assembly attached to the reservoir, wherein the output assembly is to house the rotating member.

12. The print particle replenishment device of claim 11, wherein the output assembly includes an integrated circuit including a memory device storing dispense status data and authentication data and further including a row of contact pads arranged at a side of the output assembly to contact counterpart contact pads of a host device receptacle in docked position after rotation when the opening, nozzle, and the port on the host device are aligned.

13. The print particle replenishment device of claim 1, further comprising a collapsible reservoir to provide print particles to the nozzle.

14. The print particle replenishment device of claim 13, further comprising a plunger to collapse the collapsible reservoir.

15. The print particle replenishment device of claim 13, wherein the collapsible reservoir is cylindrical about the central axis.

16. A print particle replenishment device, comprising:
- a rotating member to rotate about a central axis of the print particle replenishment device, the rotating member comprising an opening offset from the central axis;
- a nozzle offset from the central axis, wherein the nozzle is to slide with respect to an interior plane of the rotating member to align with the opening to transfer print particles through the nozzle and opening when in an open position; and
- an extension that protrudes with respect to the opening to engage a port cover of a host device to move the port cover to open a port for replenishment at rotation,
- wherein the opening is part of the extension.

17. The print particle replenishment device of claim 16, wherein the print particle replenishment device has a cylindrical outer shape and cylindrical inner shape, elongated along a print particle output direction.

18. The print particle replenishment device of claim 16, wherein the extension is tubular.

19. The print particle replenishment device of claim 18, wherein the extension is to fit within a counterpart tubular structure of the port cover.

20. A print particle replenishment device, comprising:
- a rotating member to rotate about a central axis of the print particle replenishment device, the rotating member comprising an opening offset from the central axis;
- a nozzle offset from the central axis, wherein the nozzle is to slide with respect to an interior plane of the rotating member to align with the opening to transfer print particles through the nozzle and opening when in an open position; and
- an extension that protrudes with respect to the opening to engage a port cover of a host device to move the port cover to open a port for replenishment at rotation,
- wherein an outer circumference of the print particle replenishment device is to fit within a housing sleeve of the host device.

21. The print particle replenishment device of claim 20, wherein, during a first stage rotation, the extension is to rotate into alignment with the port of the host device and the extension and the nozzle are to maintain a rotational offset.

22. The print particle replenishment device of claim 21, wherein, during a second stage rotation, the nozzle is to rotate into alignment with the extension and the port of the host device.

* * * * *